United States Patent [19]

Perez

[11] 4,269,423

[45] May 26, 1981

[54] BRAKE AND WHEEL ASSEMBLY

[76] Inventor: Hector R. Perez, HN-22EL, Comandante Ave., Country Club, Rio Piedras, P.R. 00924

[21] Appl. No.: 63,135

[22] Filed: Aug. 2, 1979

[51] Int. Cl.³ .............................................. B62D 61/00
[52] U.S. Cl. ............................... 280/80 R; 188/18 R; 188/75; 188/106 F; 188/209; 188/219.1; 192/79; 192/83; 192/115; 301/6 S; 301/132
[58] Field of Search ...................... 188/18 R, 75, 77 R, 188/219.1, 205 R, 207, 208, 209, 218 A, 106 F; 301/1, 36 R, 128, 132, 6 S; 280/80 R; 192/79, 83, 115

[56] References Cited

U.S. PATENT DOCUMENTS

| | | |
|---|---|---|
| 2,135,307 | 11/1938 | Keator . |
| 2,190,583 | 2/1940 | Wyatt . |
| 2,304,646 | 12/1942 | Lear ............................... 188/77 R X |
| 2,379,144 | 6/1945 | Goepfrich et al. .............. 188/331 X |
| 2,717,807 | 9/1955 | Kapp ........................................ 301/1 |
| 2,935,278 | 5/1960 | Lesley ........................... 301/36 R X |
| 3,036,668 | 5/1962 | Falk et al. ............................ 188/77 R |
| 3,349,873 | 10/1967 | Wycoff et al. ......................... 188/75 |
| 3,435,936 | 4/1969 | Warman ..................... 188/218 A X |
| 3,516,519 | 6/1970 | Besoyan ............................. 188/77 R |
| 4,103,799 | 8/1978 | Perez .................................... 280/402 |

FOREIGN PATENT DOCUMENTS 1068498 11/1959 Fed. Rep. of Germany ........... 301/128

Primary Examiner—George E. A. Halvosa
Attorney, Agent, or Firm—Brady, O'Boyle & Gates

[57] ABSTRACT

A brake and wheel assembly for vehicles having small diameter wheels and heavy axle loading requiring high capacity braking is disclosed. An axle extension shaft cantilevered transversely on a vehicle frame mounts rotatably a dual wheel hub which also serves as a brake rotor in coaction with a pair of wide brake shoes. A mounting unit for brake mechanism including a rigid backbone member is cantilevered from the vehicle frame across the axis of the axle extension shaft and brake rotor. The backbone member locates and supports front and rear brake cylinder bodies and associated anchor pins for the brake shoes and also supports a brake shoe upper guide. Brake shoe hold-down bases and other components are attached to a back plate of the brake mechanism mounting unit which also includes a side cover. A mechanical parking and emergency brake is included in the assembly along with required brake adjustment features. Compactness, ruggedness, ease of assembling and servicing and the use of standard automotive-type wheels are primary features.

6 Claims, 5 Drawing Figures

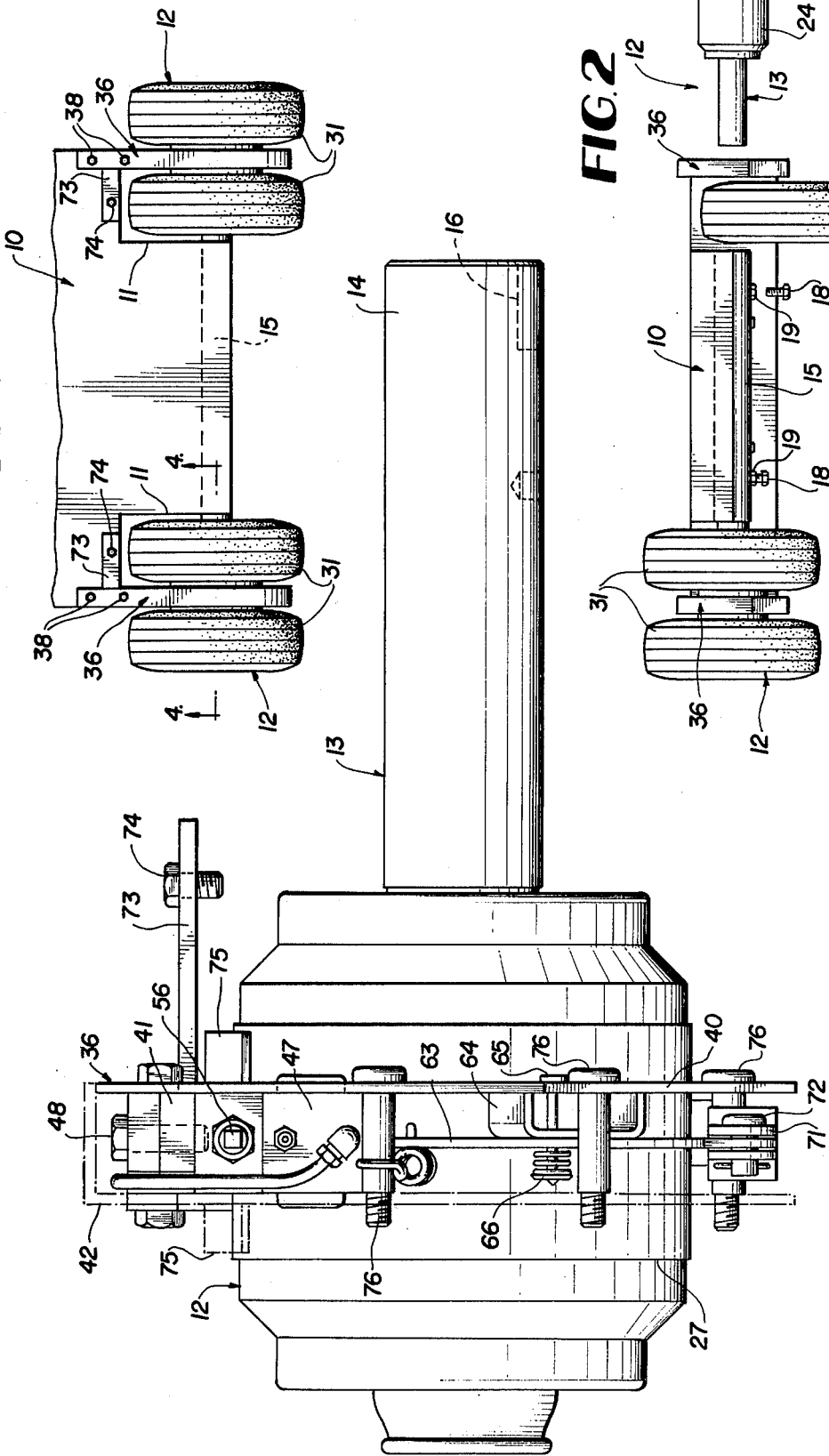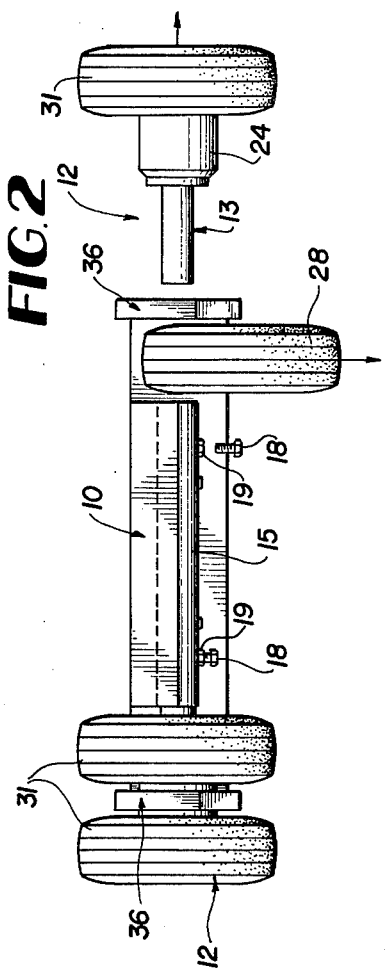

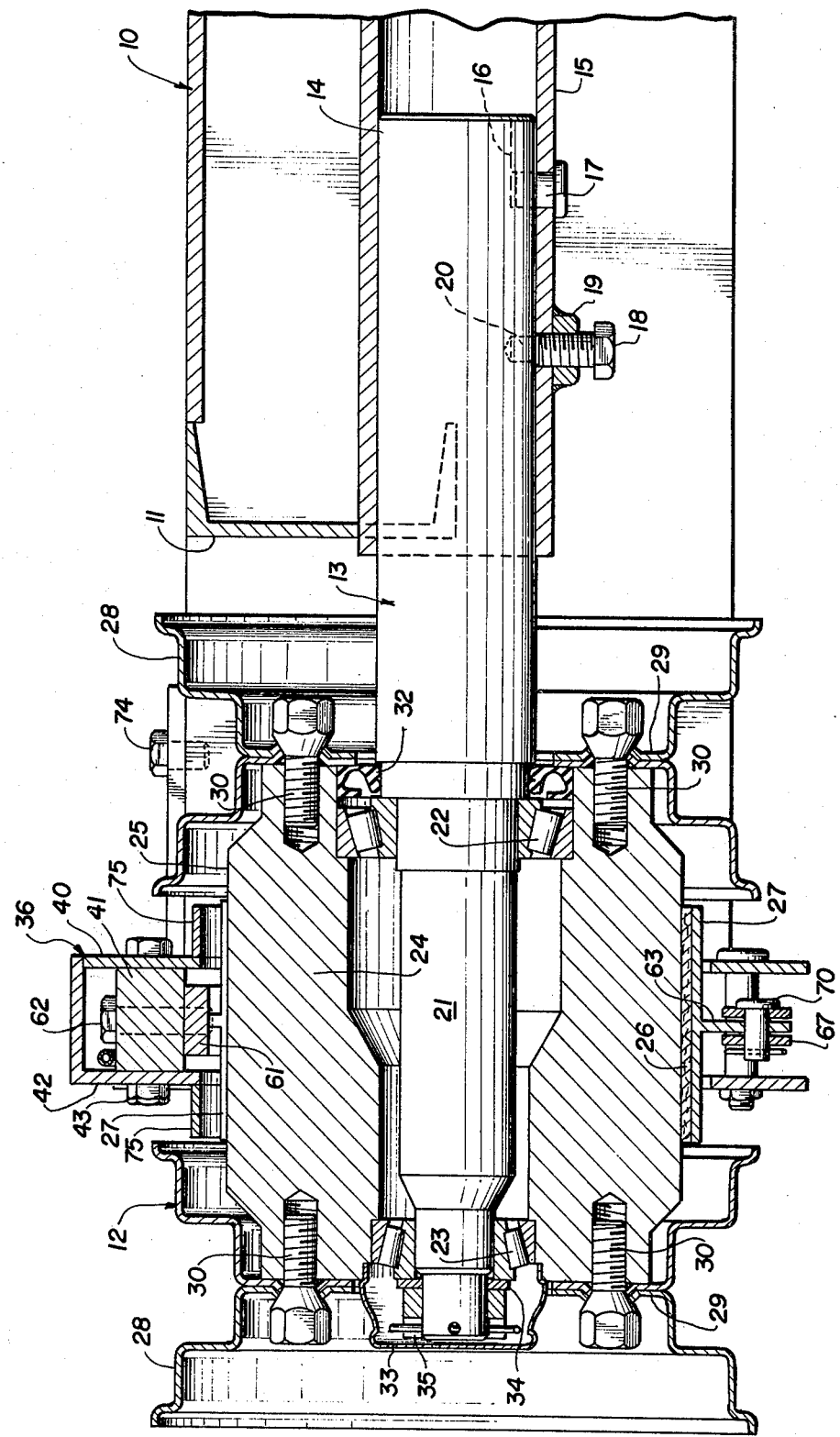

BRAKE AND WHEEL ASSEMBLY

BACKGROUND OF THE INVENTION

The objective of the invention is to provide an efficient, reliable and economical brake and wheel assembly for that class of vehicle which must utilize small diameter ground wheels with very heavy axle loading, thus requiring very high capacity braking. This class of vehicles includes many industrial and warehouse trucks and certain hoisting and towing vehicles. One example of the latter type of vehicle on which the invention is ideally suited to be used but certainly not limited to such use is U.S. Pat. No. 4,103,799 issued Aug. 1, 1978 to Perez. The invention is capable of much wider application and can be employed with excellent results on almost any high load small wheel vehicle required to carry a heavy load and therefore requiring high capacity braking.

SUMMARY OF THE INVENTION

In essence, the invention consists of a cantilevered axle extension shaft detachably secured within one end portion of a transverse axle tube at the front of the vehicle frame. A wheel hub is rotatably mounted on the axle extension shaft and has a wide cylindrical periphery enabling the hub to serve as a brake rotor in conjunction with wide friction brake shoes which surround the rotor between two standard type reduced diameter automotive wheels which are fastened to opposite ends of the rotor in partial shielding relationship with the brake shoes and associated mechanism.

A very rigid fabricated mounting plate unit for brake mechanism including a heavy backbone member at the top of the assembly is cantilevered longitudinally on the vehicle frame across the axis of the axle extension shaft and brake rotor. The mounting plate unit supports the brake mechanism components, and more particularly the backbone member is notched to seat and locate front and rear brake cylinder bodies and their associated parts. Between these two bodies, the backbone member also supports a brake shoe upper guide. Other mechanism components and adjusting elements are also located within the confines of the mounting unit which possesses a rear plate, an interior side or backing plate, and an outer side cover plate including dust shields at the top of the mechanism.

BRIEF DESCRIPTION OF THE DRAWINGS

FIG. 1 is a fragmentary plan view of the invention.

FIG. 2 is a fragmentary front elevation with one outer wheel and attached brake rotor and axle extension shaft removed and showing the adjacent inner wheel dropped down.

FIG. 4 is a transverse cross section taken on lines 4—4 of FIGS. 1 and 3.

FIG. 5 is a front elevation of the left side brake and wheel assembly with the dual wheels thereof removed and with the assembly separated from the vehicle frame.

DETAILED DESCRIPTION

Figure 3:
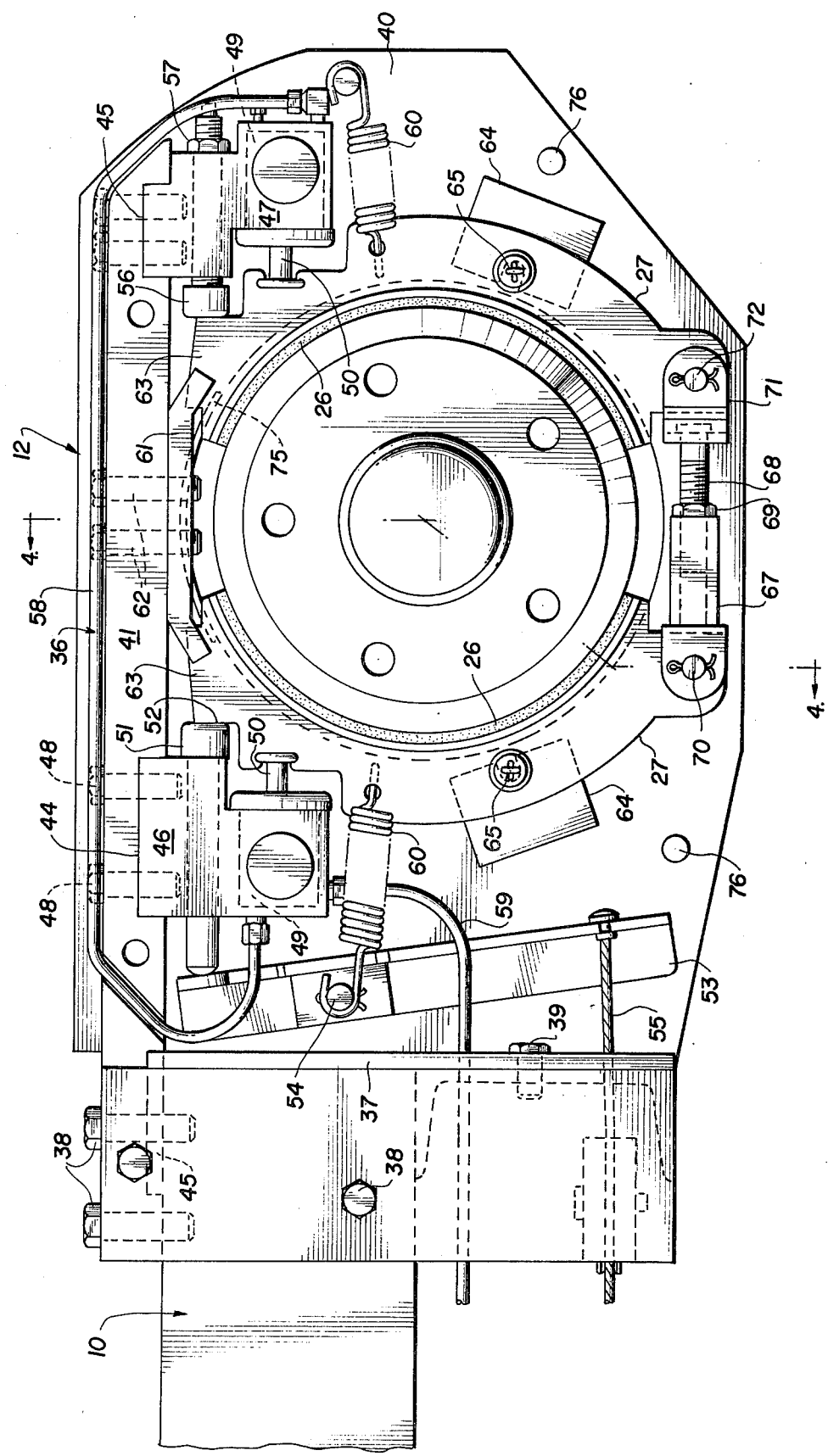
FIG. 3 is a side elevation showing the left hand brake and wheel assembly with the outer side cover plate removed.

Referring to the drawings in detail wherein like numerals designate like parts, the numeral 10 designates the frame of a vehicle on which the invention is utilized, for example, the vehicle in U.S. Pat. No. 4,103,799 or an industrial warehouse type truck. The front of the frame 10 has two corner notches 11 formed therein for a purpose which will soon be made clear. As shown in FIGS. 1 and 2, the vehicle having the frame 10 utilizes a pair of the brake and wheel assemblies designated 12 which embody the invention. Since the two assemblies are identical in construction and operation, a description of one will serve adequately to describe both.

Each assembly 12 comprises a sturdy axle extension shaft 13 whose interior end portion 14 is socketed detachably in one end of a front transverse axle tube 15, attached by welding or the like to the vehicle frame 10. The inner end of shaft portion 14 has a locator slot 16 formed therein and receiving a fixed locator pin 17 carried by the axle tube 15. A locking screw 18 for the shaft 13 has screw-threaded engagement with a nut element 19 welded to the tube 15 and has its inner tip received in a locking recess 20 formed radially in the shaft portion 14.

As shown in FIG. 4, the axle extension shaft 13 is cantilevered on the frame 10 from its tube 15 and includes in the region of the notch 11 a reduced diameter section 21 engaged in conventional wheel bearings 22 and 23. Freely journaled on these bearings is a combined wheel hub and brake rotor 24 which is suitably massive and which includes axially wide peripheral braking surface 25 adapted to be engaged by the friction linings 26 of a pair of wide opposing brake shoes 27, to be further described.

The opposite end faces of the hub 24 serve to mount a pair of small diameter standard type automotive wheels 28 whose radial webs 29 are secured to the hub end faces by conventional lug screws 30. The standard wheels 28 carry suitable pneumatic tires, not shown in FIG. 4 but indicated at 31 in FIGS. 1 and 2 of the drawings. Thus, each brake and wheel assembly 12 is a dual wheel assembly in the disclosed embodiment of the invention. A grease seal 32 is provided inboard of the bearing 22 and a grease cap 33 is provided outwardly of bearing 23 surrounding a bearing retainer washer 34 and an associated retainer nut 35 and cotter pin. The combined wheel hub and brake rotor 24, together with the dual wheels 28, thus forms a free rotating unit on the axle extension shaft 13 which is removably fixed to the axle tube 15. It is to be noted particularly in FIG. 4 that the rotor and bearings 22 and 23 and associated parts are partially enclosed by the two wheels 28 which overlap the ends of the rotor 25 for considerable distances. This is not only very compact but enables the wheels to form a partial housing around the rotor on opposite sides of the brake shoe mechanism and its mounting unit, to be described. With reference to FIG. 1, it can be seen that the interior wheel of each assembly 12 is located in one of the notches 11 of the frame 10.

A very important aspect of the invention resides in the provision of a very rigid mounting plate unit 36 for the brake shoe mechanism and associated components of each brake and wheel assembly 12. The unit 36 is cantilevered from the main frame 10 of the vehicle and extends longitudinally at right angles to the axis of the rotor 24 and extension shaft 13. The unit 36 includes a rear mounting plate 37 attached by screws 38 and 39, FIG. 3, to portions of the frame 10. The unit additionally comprises an interior side or backing plate 40 joined by welding to the rear mounting plate 37 and lying in a vertical plane. The unit 36 further comprises an upper heavy longitudinal backbone bar 41 rigidly secured to the plates 37 and 40 as by welding to produce a unitized support structure. Each unit 36 additionally comprises an exterior side cover plate 42 which is removable and secured in place on the unit by side cover screws 43.

Locating and seating notches 44 and 45 for rear and forward block-like brake cylinder bodies 46 and 47 are provided in the bottom of backbone bar 41. The bodies 46 and 47 are firmly anchored in the notches 44 and 45 by screws 48, and the rather heavy stresses transmitted through the brake cylinder bodies 46 and 47 from the brake shoes 27 during brake application are borne by the heavy backbone bar 41 primarily and not by the anchoring screws 48 due to the provision of the notches 44 and 45.

The bodies 46 and 47 carry conventional automotive-type brake cylinders 49 including brake shoe actuating pins 50 coupled to the shoes 27 in a conventional manner near corresponding ends thereof. The body 46 also carries a sliding anchor pin 51 whose head may abut a surface 52 on one brake shoe and whose opposite end is in sliding contact with a hand or emergency brake lever 53 pivoted between its ends on a stud 54 secured to side plate 40 of the unit 36. The lever 53 is manually operated through a cable means 55 connected to a hand brake lever, not shown, in the driver's compartment of the vehicle. The arrangement provides for emergency mechanical operation of the vehicle wheel brakes which are normally hydraulically operated and also provides a secure parking brake.

The forward cylinder body 47 carries a threaded anchor pin 56 having a locking nut 57. This threaded anchor pin is utilized for initial primary brake shoe adjustment at the time of assembly. The brake cylinders 49 are connected by a hydraulic fluid line 58, as indicated in FIG. 3, and one cylinder 49 receives fluid through a line 59 leading to a remote pump, not shown, or master cylinder.

The two brake shoes 27 are biased to inactive positions by retractile springs 60 in the customary manner. The upper ends of the two shoes are guided and restrained against lateral displacement by an upper guide 61 secured to the bottom of backbone bar 41 by screws 62. The opposite ends of the upper guide 61 are slotted to straddle the webs 63 of the shoes 27 for guidance purposes.

Brake shoe stabilizer or hold-down members 64 are anchored by pins 65 to the side plate 40, and compression springs 66 retained on these pins, FIG. 5, bear against the webs 63 of the brake shoes to yieldingly oppose lateral movement thereof and hold them against the members or bases 64 during brake operation.

The lower ends of the shoes 27 away from the upper guide 61 are adjustably coupled in a conventional manner through a clevis nut 67 and a coacting adjuster screw 68 by means of which the customary wear-compensating brake adjustments are made. An adjuster screw lock nut 69 is provided, as shown. The clevis nut 67 has its head pivotally coupled by a pin 70 to one shoe 27, and a separate head or base 71 having swiveled engagement with adjuster screw 68 is pivoted by another pin 72 to the opposing brake shoe 27. During brake application, the brake shoe mechanism tends to be self-energizing in accordance with automotive brake practice. The brake hydraulic system, being generally conventional, need not be further described.

Another feature of the invention resides in the provision of a lateral alignment and anchor plate 73 on each mounting unit 36, rigid therewith and overlying the top of vehicle frame 10, FIG. 1, and being anchored thereto by a screw 74. A further feature is the provision of a dust shield 75 on each side of the mounting unit 36 to bridge the gap between the tops of the two shoes in order to protect the brakes against the entry of water and foreign debris in this region. Studs 76 are provided on the interior side plate 40 for the further anchoring of the removable outer side cover plate 42.

The normal operation of the braking system being conventional requires no detailed description. In summation, the invention provides a readily demountable brake rotor and dual wheel sub-assembly including axle extension shaft 13 which can be separated from the axle tube 15, as depicted in FIG. 2, merely by retracting the locking screw 18 and dropping the interior wheel 28, as indicated, after removing the lug screws 30 connecting it to the hub 24, and withdrawing as an assembly the extension shaft 13, wheel hub and brake rotor 24 and the exterior wheel connected thereto. The remaining brake shoe mechanism and associated elements are all supported on the rigid fabricated mounting unit 36 having the stress-absorbing backbone bar 41, as fully described. Both the units 36 and the wheel and rotor assemblies are securely cantilivered on cross axes from the frame 10.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A brake and wheel assembly adapted for mounting to a vehicle frame comprising a brake rotor also serving as a dual wheel hub, dual wheels detachably secured to opposite end faces of said rotor and forming a rotational unit therewith, an axle extension shaft including rotor support bearings carrying said rotational unit, means for detachably connecting said axle extension shaft to a vehicle frame part, said axle extension shaft extending from the outer wheel of said dual wheel inwardly through said rotor and the inner wheel of said dual wheels to said vehicle frame part, a brake shoe mechanism mounting unit arranged in cross axis relationship to said rotor and axle extension shaft and adapted for connection to a vehicle frame in cantilevered relationship thereto, said mounting unit including rear and interior side plates and a top backbone bar in unitized relationship and also including a detachable outer side cover plate, brake shoes within said mounting unit in opposing relationship and in surrounding relationship to said rotor, brake shoe hydraulic actuator means in said mounting unit including bodies located and seated on said backbone bar in a manner to transmit stresses developed by brake application through said bodies directly to the backbone bar, and brake shoe adjusting and release biasing means within said mounting unit.

2. A brake and wheel assembly as defined in claim 1, and a guide for corresponding ends of said brake shoes between said bodies and being attached directly to said backbone bar.

3. A brake and wheel assembly as defined in claim 1, and said backbone bar having spaced seating and locating notches for said bodies.

4. A brake and wheel assembly as defined in claim 1, and a sliding anchor pin in one of said bodies abuttable with one brake shoe of said mechanism, and an emergency brake lever pivoted on said mounting unit and engaging said sliding anchor pin.

5. A brake and wheel assembly as defined in claim 1, and a laterally extending alignment and stabilizing plate rigid with said mounting unit and adapted to be anchored to a vehicle frame.

6. A brake and wheel assembly as defined in claim 1, wherein said means for detachably connecting said axle extension shaft to said vehicle frame part comprises, a locator pin mounted on said frame part, a slot formed in said extension shaft for receiving said locator pin, a recess formed in said shaft, and a locking screw extending through said frame part and into said recess.

* * * * *